US012665141B2

(12) United States Patent
Rizzi et al.

(10) Patent No.: US 12,665,141 B2
(45) Date of Patent: Jun. 23, 2026

(54) ACTUATION UNIT FOR A SWITCHING APPARATUS

(71) Applicant: ABB Schweiz AG, Baden (CH)

(72) Inventors: Corrado Rizzi, Fornovo San Giovanni (IT); Alessandro Stucchi, Dalmine (IT); Ettore Pellegrinelli, Ponteranica (IT); Dario Leidi, Ubiale Clanezzo (IT)

(73) Assignee: ABB Schweiz AG, Baden (CH)

( * ) Notice: Subject to any disclaimer, the term of this patent is extended or adjusted under 35 U.S.C. 154(b) by 287 days.

(21) Appl. No.: 18/430,095

(22) Filed: Feb. 1, 2024

(65) Prior Publication Data

US 2024/0266123 A1 Aug. 8, 2024

(30) Foreign Application Priority Data

Feb. 3, 2023 (EP) .................................... 23154944

(51) Int. Cl.
*H01H 3/30* (2006.01)
*H01H 3/42* (2006.01)

(52) U.S. Cl.
CPC ................ *H01H 3/30* (2013.01); *H01H 3/42* (2013.01)

(58) Field of Classification Search
CPC H01H 3/30; H01H 3/42; H01H 33/40; H01H 3/3015; H01H 3/38; H01H 3/32; H01H 3/46
USPC ................................................. 200/400, 500
See application file for complete search history.

(56) References Cited

U.S. PATENT DOCUMENTS 5,938,008 A 8/1999 Wehrli, III et al.
6,437,269 B1 * 8/2002 Rakus ................. H01H 3/3015 200/400
9,202,643 B2 * 12/2015 Belin ...................... H01H 3/60
11,227,728 B2 * 1/2022 Miller ..................... H01H 3/40
2003/0034242 A1 2/2003 Mori et al.
2004/0179318 A1 9/2004 Hashimoto et al.

FOREIGN PATENT DOCUMENTS

JP S5168371 U 5/1976

OTHER PUBLICATIONS

European Extended Search Report, Application No. 23154944.5, dated Jul. 3, 2023, 13 pps.

* cited by examiner

*Primary Examiner* — Lheiren Mae A Caroc
(74) *Attorney, Agent, or Firm* — McCarter & English, LLP

(57) ABSTRACT

An actuation unit for a switching apparatus is provided. The actuation unit includes a rotating contact shaft coupled to the movable contacts of the switching apparatus and first mechanical actuation means coupled to the contact shaft and configured to actuate the contact shaft during a closing maneuver of the switching apparatus. The first mechanical actuation means include a spring assembly, a first lever member coupled to the spring assembly and a plurality of second lever members coupling the first lever member to the contact shaft. The first mechanical actuation means include a rotating cam assembly including one or more cam members couplable to the first lever member of the first mechanical actuation means. The actuating unit includes a brake member for reducing the rotational speed of the cam assembly, when the cam assembly is rotating towards a rest position, during a closing maneuver of the switching apparatus.

14 Claims, 10 Drawing Sheets

ACTUATION UNIT FOR A SWITCHING APPARATUS

CROSS REFERENCE TO RELATED APPLICATIONS

This patent application claims the benefit and priority of European Patent Application No. 23154944.5 filed on Feb. 3, 2023, the disclosure of which is incorporated by reference herein in its entirety as part of the present application.

BACKGROUND

The present disclosure relates to the field of electrical systems operating at low or medium voltage levels. In particular, the present disclosure relates to an actuation unit for a switching apparatus operating at low or medium voltage levels.

Switching apparatuses, such as circuit breakers, contactors, disconnectors and the like, are widely used in switchgears, electric power distribution lines, or other electrical systems.

As is known, a switching apparatus typically includes a plurality of electric poles, each including a fixed contact and a movable contact. The movable contacts of the electric poles are mechanically and electrically coupled with and decoupled from the corresponding fixed contacts during closing and opening maneuvers of the switching apparatus.

A switching apparatus generally includes an actuation unit operatively coupled to the movable contacts in order to move reversibly these latter between the above-mentioned coupled and uncoupled positions relative to said fixed contacts.

In many switching apparatuses of the state of the art, such an actuation unit includes a rotating contact shaft mechanically coupled to the movable contacts of the electric poles and mechanical actuation means mechanically coupled to said contact shaft for actuating this latter (and consequently the movable contacts of the electric poles) during a closing maneuver of the switching apparatus.

Typically, said mechanical actuation means are of the spring-operated type. They include one or more actuation springs mechanically coupled to the contact shaft through a suitable kinematic chain. During a closing maneuver of the switching apparatus, the actuation springs are triggered to pass from a loaded condition to a released condition. In this way, the stored mechanical energy can be transmitted through the above-mentioned kinematic chain and be employed to actuate the contact shaft.

In order to bring the above-mentioned actuation springs in a loaded condition (loading maneuver), the actuation unit includes mechanical loading means coupled to the kinematic chain linking the actuation springs to the contact shaft.

In many cases, these mechanical loading means include an actuator operable by a user, for example a lever mechanism or an electric motor, and a rotating cam assembly mechanically coupled to said actuator and to a lever member of said kinematic chain. The cam assembly includes suitable cam elements to actuate the above-mentioned lever member.

When a loading operation of the spring assembly has to be carried out, a user activates the above-mentioned actuator. This latter actuates the cam assembly, which in turn actuates the lever member coupled thereto and, consequently, bring the actuation springs in a loaded condition. In this way, the actuation springs can store the mechanical energy necessary to carry out a closing maneuver of the switching apparatus.

During a closing maneuver of the switching apparatus, the above-mentioned cam assembly moves back to a rest position upon actuation by the above-mentioned lever member as the actuation springs release the stored mechanical energy.

The actuation unit of currently available switching apparatuses has some aspects to improve in relation to the above-mentioned mechanical loading means.

As a matter of fact, due to the relatively high amount of mechanical energy released by the actuation springs, the cam assembly comes back to the rest position with a high rotational speed as it is subject to high actuation forces imparted by the above-mentioned lever member. When reaching the above-mentioned rest position, the cam assembly typically hits with strength some surrounding components, for example parts of the above-mentioned lever member, which operates, in practice, as an end-of-run element for the cam assembly.

It has been seen that these repeated collisions may cause a deterioration of the structural integrity of the involved parts over time. This may lead to their structural failure with consequent need for time-consuming and expensive maintenance interventions.

BRIEF DESCRIPTION

The main aim of the present disclosure is to provide an actuation unit for a switching apparatus operating at low or medium voltage levels, which allows solving or mitigating the above-mentioned problems.

More in particular, it is an aspect of the present disclosure to provide an actuation unit, which ensures higher levels of reliability in operation.

As a further aspect, the present disclosure is aimed at providing an actuation unit, which has a relatively simple and space-saving structure.

Still another aspect of the present disclosure is to provide an actuation unit, which can be easily manufactured at industrial level, at competitive costs with respect to the solutions of the state of the art.

In order to fulfill these aim and aspects, the present disclosure provides an actuation unit for a switching apparatus, according to the following claim 1 and the related dependent claims.

In a general definition, the actuation unit, according to the disclosure, is configured to actuate one or more movable contacts of the switching apparatus during a closing operation and an opening operation of said switching apparatus.

The actuation unit, according to the disclosure, includes a contact shaft, which is coupled to the movable contacts of the switching apparatus and is reversibly movable about a corresponding first rotation axis, and first mechanical actuation means, which are coupled to said contact shaft and are configured to actuate said contact shaft during a closing maneuver of said switching apparatus.

The first mechanical actuation means include a spring assembly including one or more spring elements. The spring assembly is configured to take reversibly a loaded condition, at which said spring elements are loaded and consequently store mechanical energy, and a released condition, at which said spring elements have released the stored mechanical energy.

The first mechanical actuation means further include a kinematic chain coupling the spring assembly to the contact shaft. Such a kinematic chain includes a first lever member movable about a second rotation axis parallel to the first rotation axis of the contact shaft and coupled to the spring assembly. In particular, the first lever member is configured to move reversibly, by rotating according to opposite directions about said second rotation axis, between a first position, which corresponds to a loaded condition of said spring assembly, and a second position, which corresponds to a released condition of said spring assembly.

The actuation unit, according to the disclosure, further includes mechanical loading means configured to actuate said first lever member in order to make said spring assembly pass from said released condition to said loaded condition.

Said mechanical loading means include a cam assembly movable about a third rotation axis parallel to the first rotation axis of the contact shaft and including one or more cam units, each having a cam surface couplable to said first lever member. Said cam assembly is configured to move reversibly, by rotating about said third rotation axis according to a predefined direction, between a third position, which corresponds to a first position of said first lever member, and a fourth position, which corresponds to a second position of said first lever member.

In operation, said cam assembly actuates said first lever member and makes said first lever member move from said second position to said first position, when said cam assembly moves from said fourth position to said third position upon actuation by an actuating device coupled to said cam assembly. Said cam assembly holds said first lever member when said cam assembly is in said third position and it leaves said first lever member free to move from said first position to said second position, when said cam assembly moves away from said third position.

In operation, said first lever member actuates said spring assembly and makes said spring assembly pass from said released condition to said loaded condition, when said first motion transmission assembly moves from said second position to said first position upon actuation by said cam assembly. Said first lever member holds said spring assembly in said loaded condition when first said lever member is in said first position and it leaves said spring assembly free to pass from said loaded condition to said released condition, when said first lever member moves away from said first position.

According to the disclosure, the actuation unit includes, for at least a cam member of the cam assembly, a brake member configured to brake said cam assembly, when this latter moves from said third position to said fourth position.

Each brake member is in a fixed position relative to a corresponding cam member, and it has a sliding surface configured to come into frictional contact with the cam surface of a corresponding cam member, during a rotation movement of said cam assembly from said third position to said fourth position. The mechanical interaction between each brake member and the cam surface of the corresponding cam member causes a reduction of the rotational speed of said cam assembly.

According to an aspect of the disclosure, each brake member is positioned relative to the corresponding cam member, so that the sliding surface of said brake member comes into frictional contact with the cam surface of said cam member at an initial stage of the rotation movement of said cam assembly from said third position to said fourth position.

According to an aspect of the disclosure, each brake member has a portion of elastic material including said sliding surface.

According to an aspect of the disclosure, each brake member is fixed to a support wall of said actuation unit in proximal position to a corresponding cam member.

According to an aspect of the disclosure, each brake member is formed by a roller fixed to a support wall of said actuation unit. Said roller includes said sliding surface couplable to the cam surface of a corresponding cam member.

Each roller may have an outer layer of elastic material, which includes said sliding surface. According to an aspect of the disclosure, said cam assembly includes a pair of cam members spaced apart one from another along third rotation axis. Said actuation unit may include a brake member for each cam member.

According to an aspect of the disclosure, the above-mentioned spring assembly includes a first end portion fixed to a support, a second end portion opposite to said first end portion and coupled to said first lever member and one or more compression springs arranged between said first and second end portions.

According to an aspect of the disclosure, the above-mentioned first lever member has a third end portion coupled to said spring assembly and a fourth end portion opposite to said third end portion relative to said second rotation axis and coupled to said contact shaft through one or more second lever members. Said first lever member further includes one or more sliding elements arranged at said fourth end portion. Each sliding element has a sliding surface couplable to the cam surface of a corresponding cam member.

In a further aspect, the present disclosure relates to a switching apparatus, according to the following claim 13 and the related dependent claims.

BRIEF DESCRIPTION OF THE DRAWINGS

Further characteristics and advantages of the disclosure will emerge from the description of example, but not exclusive embodiments of the contactor, according to the disclosure, non-limiting examples of which are provided in the attached drawings, wherein.

DETAILED DESCRIPTION

With reference to the figures, the present disclosure relates to an actuation unit for a switching apparatus, such as a circuit breaker, a contactor, a disconnector or the like.

The actuation unit, according to the disclosure, is particularly suitable for use in medium voltage switching apparatuses, i.e., operating at voltage levels higher than 2.0 kV AC and 2.5 kV DC up to several tens of kV, for example 72 kV AC and 100 kV DC. In principle, however, it may be used also in low-voltage switching apparatuses, i.e., operating at voltage levels lower than 2.0 kV AC and 2.5 kV DC.

Figure 1:
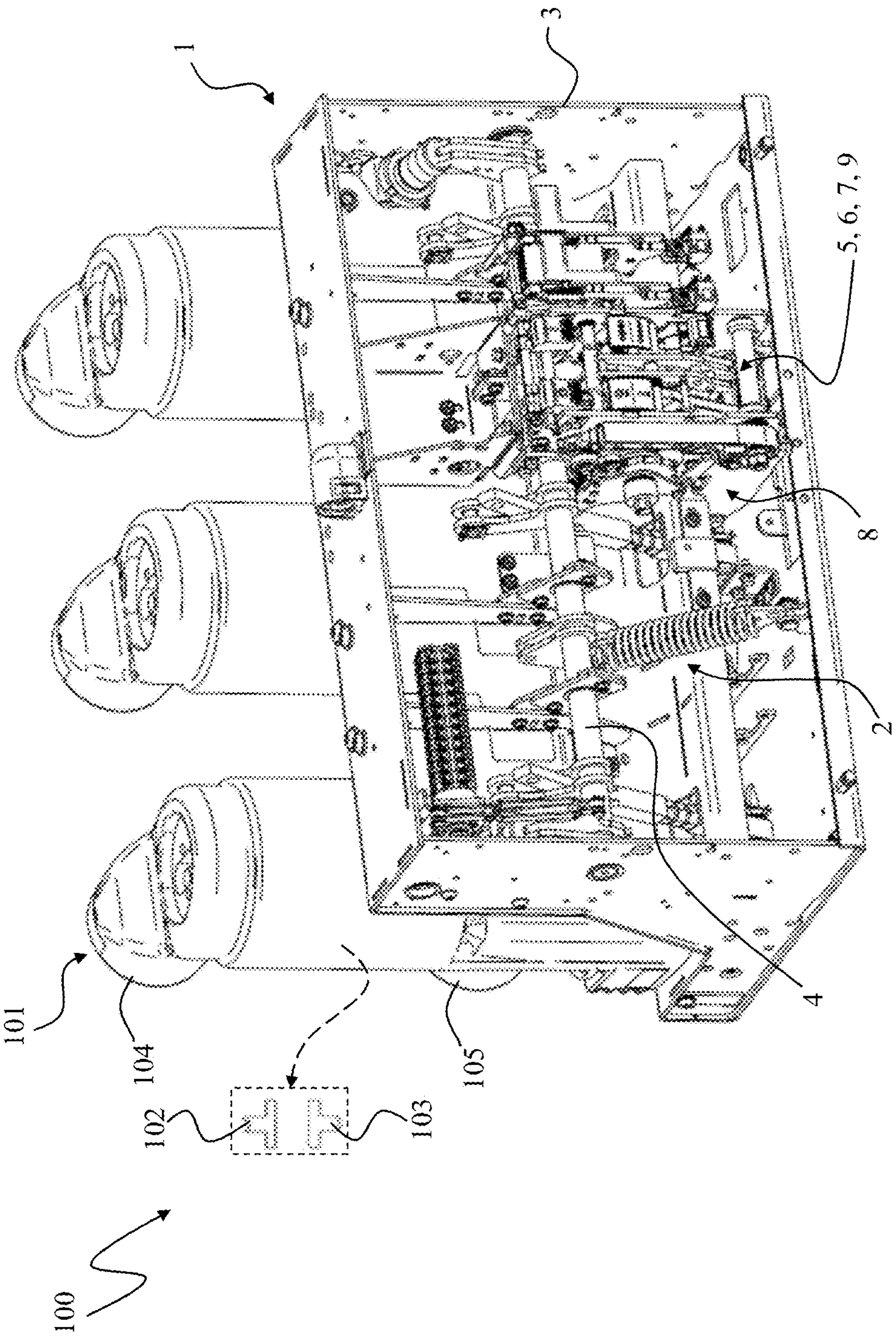
FIG. 1 is a schematic view of the switching apparatus including an actuation unit, according to the disclosure.
Figure 2:
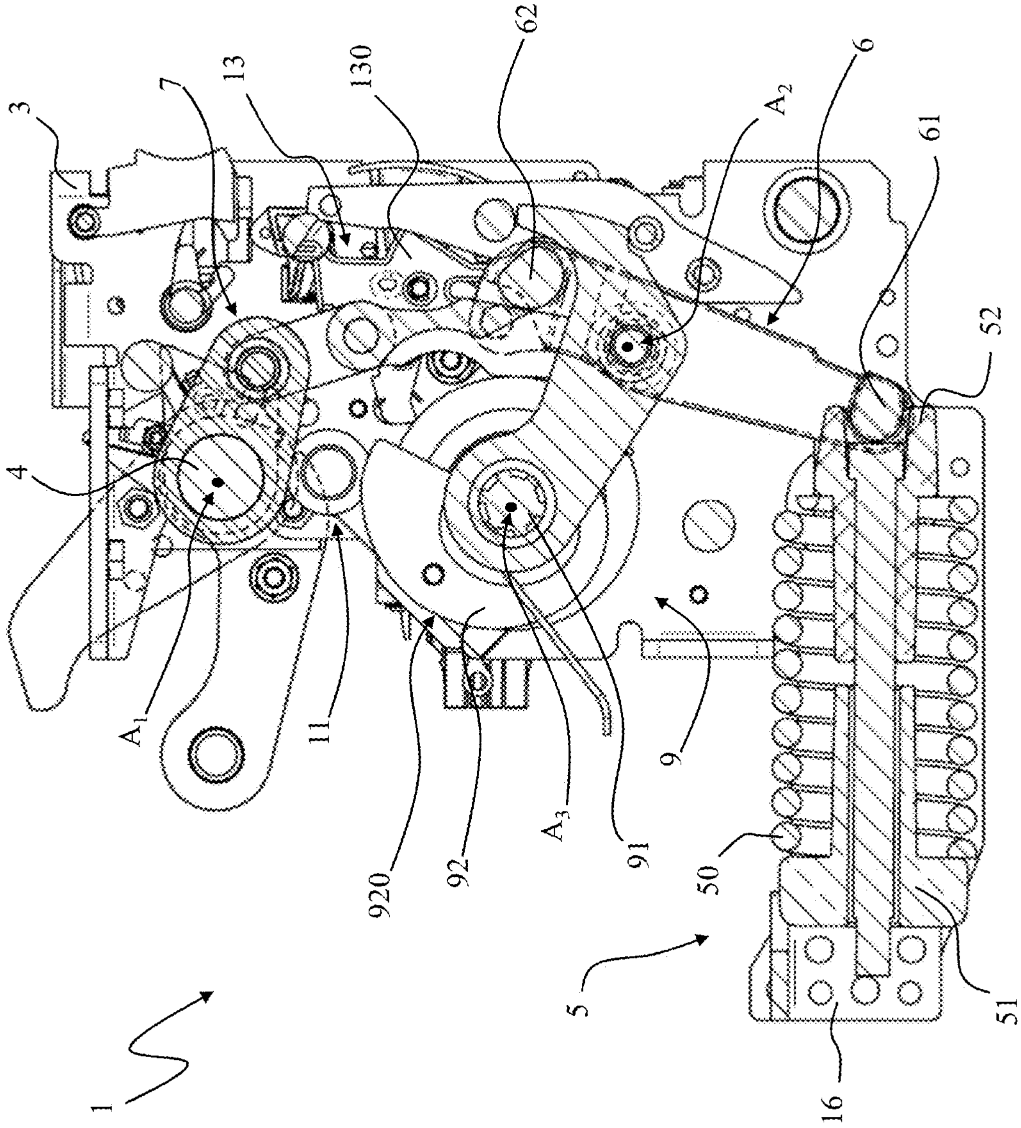
FIGS. 2, 3, 4A, 4B, and 5 are schematic views of some mechanical components of the actuation unit shown in FIG. 1, where Area A in FIG. 4B illustrates an exploded portion of FIG. 4A.

FIG. 1 shows a schematic view of a switching apparatus 100 including an actuation unit 1 according to the disclosure.

The switching apparatus 100 includes one or more electric poles 101.

The switching apparatus 100 may be of the multi-phase type, more particularly of the three-phase type, as shown in the cited figures.

For each electric pole 101, the switching apparatus 100 includes a fixed contact 102 and a movable contact 103, which are electrically connected to corresponding first and second pole terminals 104, 105 electrically connectable to suitable conductors of an electric line.

The movable contact 103 of each electric pole 101 is reversibly movable between a decoupled position and a coupled position relative to the corresponding fixed contact 102. When it is in a decoupled position, the movable contact 103 is electrically and mechanically decoupled from the corresponding fixed contact while, when it is in a coupled position, the movable contact 103 is electrically and mechanically coupled with the corresponding fixed contact.

As in the switching apparatus shown in the cited figures, each movable contact 103 may move translationally along a main longitudinal axis of a corresponding electric pole. In principle, however, the movable contacts of the switching apparatus may move rotationally to couple with or decouple from the corresponding fixed contacts.

The transition of the movable contacts 103 from a coupled position with to a decoupled position from the corresponding fixed contacts 102 represents an opening maneuver of the switching apparatus whereas the transition of the movable contacts 103 from a decoupled position to a coupled position with the corresponding fixed contacts 102 represents a closing maneuver of the switching apparatus.

In general, the electric poles 101 of the switching apparatus may be realized at industrial level according to solutions of known type. Therefore, in the following, these components will be described in relation to the aspects of interest of the disclosure only, for the sake of brevity.

The switching apparatus 100 includes an actuation unit 1 configured to actuate the movable contacts 103 of the electric poles during a closing maneuver and an opening maneuver of the switching apparatus.

The actuation unit 1 may include an outer enclosure 3 and a number of internal support walls 10 partitioning the internal volume of the actuation unit and providing support to the internal components thereof.

According to the disclosure, the actuation unit 1 includes a contact shaft 4 coupled to the movable contacts 103 of the electric poles through suitable motion transmission mechanisms (not shown), for example of the crank-lever type.

For the sake of clarity, it is specified that the terms “connect-” and “couple-” used in this disclosure generally relate to a mechanical connection or coupling between the involved parts or components. In other words, the terms “connect” or “couple” should be intended as “mechanically couple-” and “mechanically connect-” unless otherwise specified.

The contact shaft 4 is reversibly movable about a corresponding first rotation axis $A_1$ may be oriented along a longer dimension of the actuation unit.

According to the disclosure, the actuation unit 1 includes first mechanical actuation means 5, 6, 7 configured to actuate the contact shaft 4 during a closing maneuver of the switching apparatus.

The above-mentioned first mechanical actuation means includes a spring assembly 5 including one or more spring elements 50.

The spring assembly 5 is configured to take reversibly a loaded condition A, at which the spring elements 50 are loaded and store mechanical energy, and a released condition B, at which the spring elements 50 have released the stored mechanical energy.

In the embodiment shown in the cited figures, the spring assembly 5 includes a first end portion 51 fixed to an internal support 16 of the actuation unit, a second end portion 52 opposite to said first end portion and one or more compression springs 50 arranged between said first and second end portions, conveniently in such a way to be mutually coaxial.

The above-mentioned first mechanical actuation means further includes a kinematic chain 6, 7 coupling the spring assembly 5 to the contact shaft 4.

Such a kinematic chain includes a first lever member 6 configured to rotate about a second rotation axis $A_2$ parallel to the first rotation axis $A_1$ of the contact shaft 4.

The first lever member 6 is coupled to the spring assembly 5 and (indirectly) to the contact shaft 4.

The first lever member 6 is configured to move reversibly between a first position C, which corresponds to a loaded condition A of the spring assembly 5, and a second position D, which corresponds to a released condition B of the spring assembly 5. The first lever member 6 moves between the above-mentioned first and second positions C, D by rotating according to opposite directions $R_1$, $R_2$ about the second rotation axis $A_2$.

In the embodiment shown in the cited figures, the first lever member 6 has a third end portion 61 coupled to the spring assembly 5 (namely to the second end portion 52 of this latter) and a fourth end portion 62, which is opposite to the third end portion 61 relative to the rotation axis $A_2$ and is coupled (indirectly) to the contact shaft 4. At the fourth end portion 62, the first lever member 6 includes one or more sliding elements 65, each having a sliding surface 650.

Figure 5:
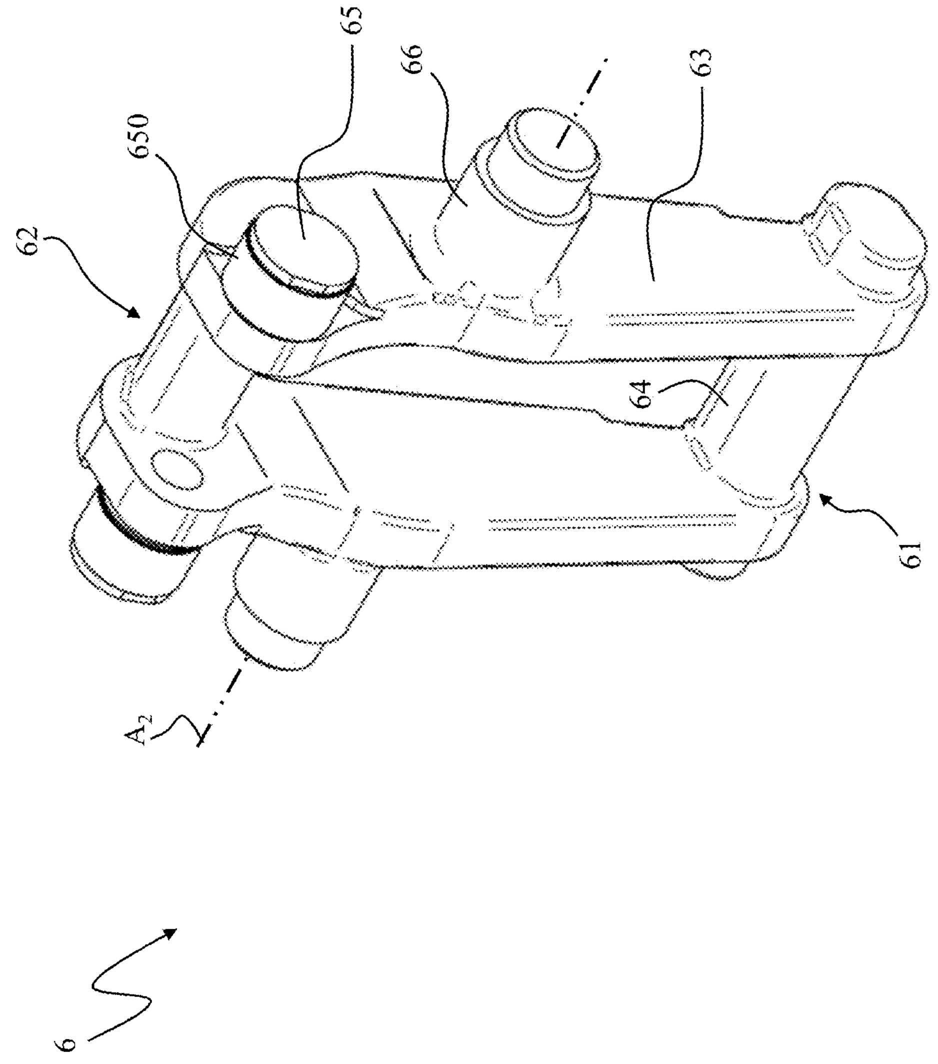

FIG. 5 shows in more details a possible configuration for the first lever member 6 according to the embodiments shown in the cited figures. In this case, the first lever member 6 includes first lever arms 63 extending in parallel according to a longer dimension of the first lever member and second lever arms 64 traversal to the first lever arms 63 and joining these latter at the opposite end portions 61, 62 of the first lever member.

Figure 3:
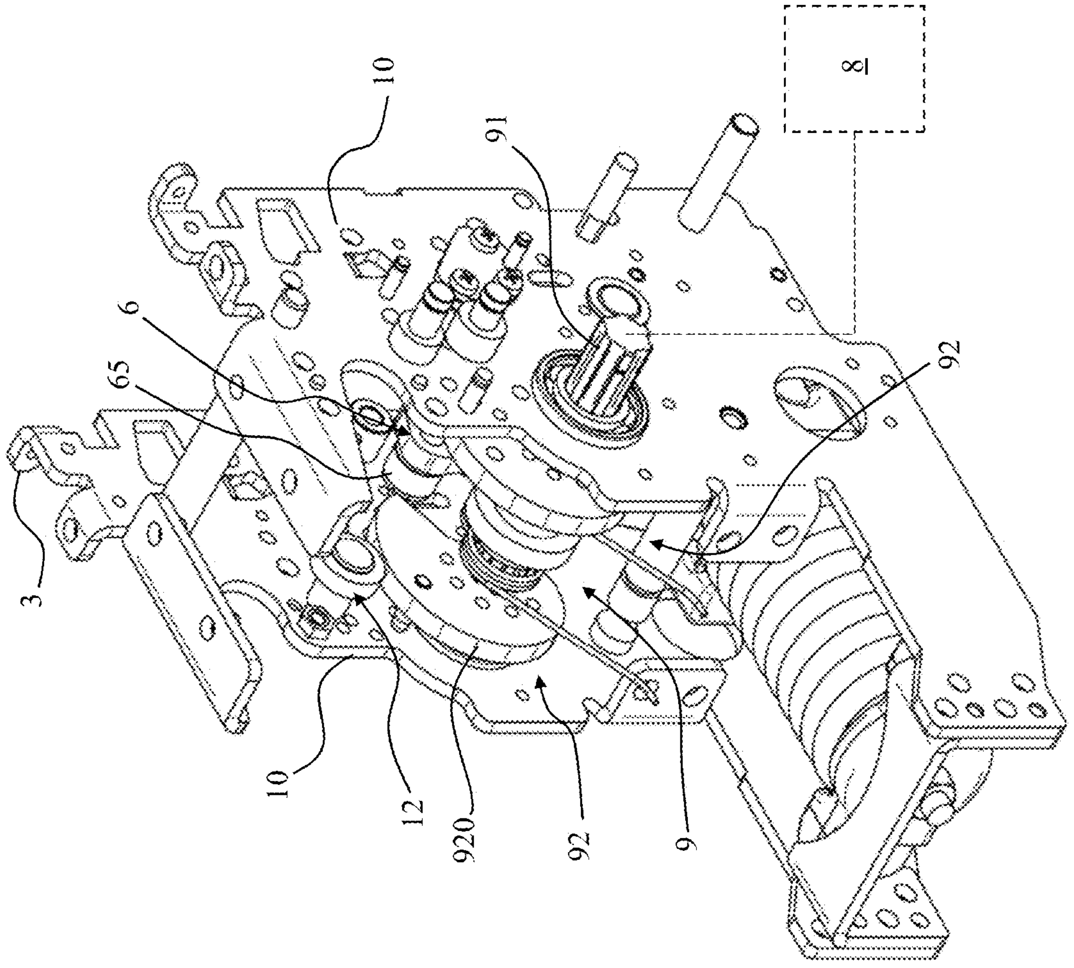
Figure 4A:
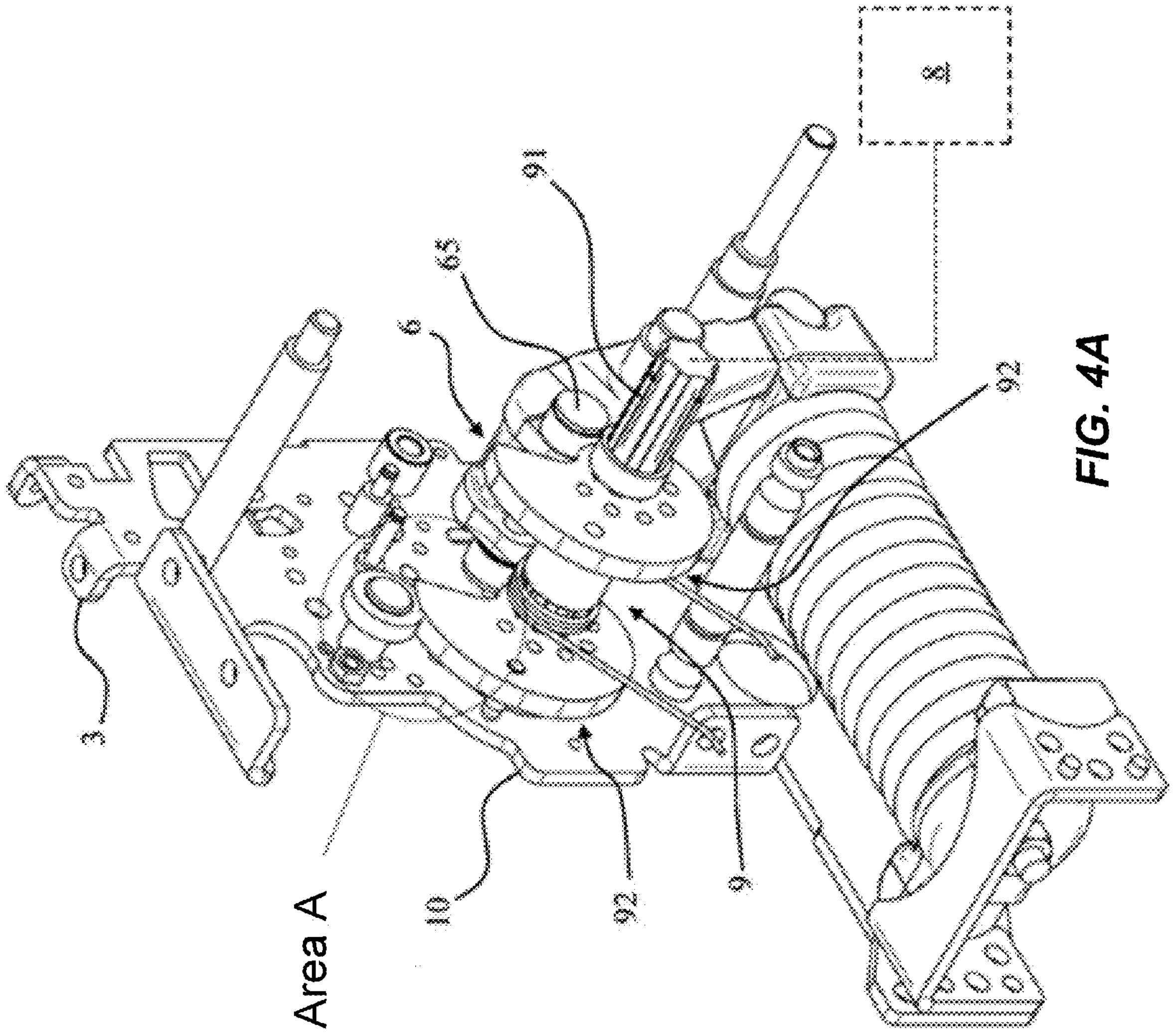
Figure 4B:
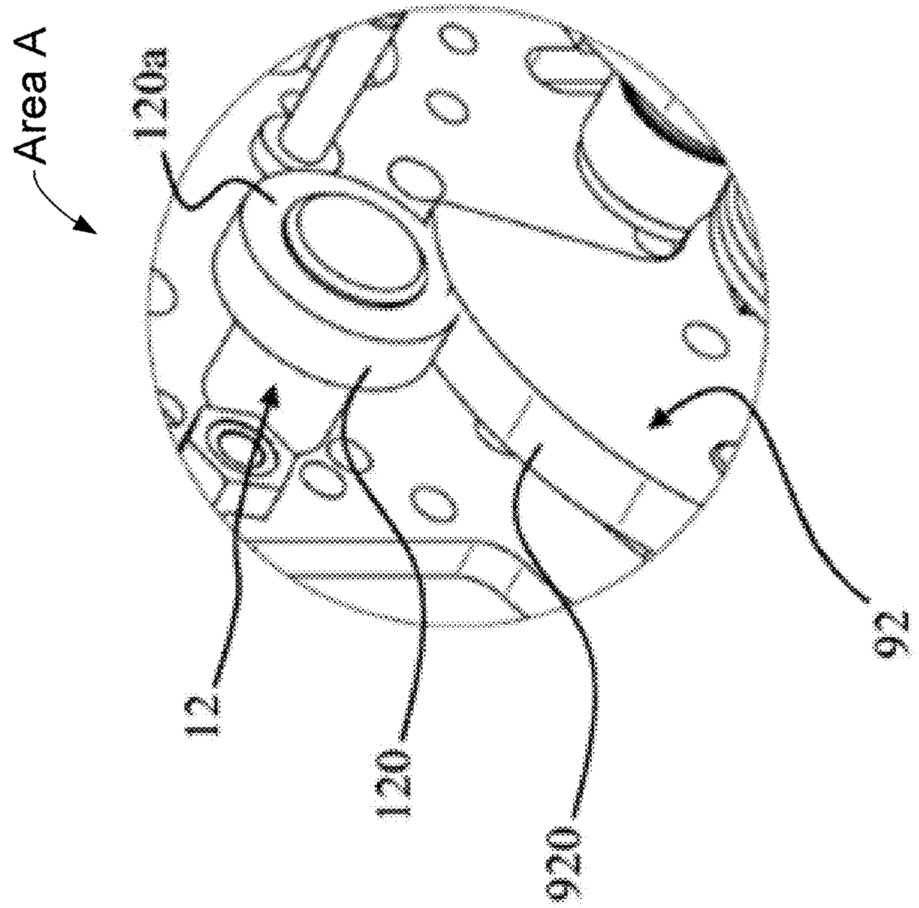

In an intermediate position between the above-mentioned end portions, each lever arm 63 has a shaped protrusion 66 oriented outwardly (i.e., according to an opposite direction relative to the other lever arm). The shaped protrusions 66 are aligned along the second rotation axis $A_2$ of the first lever member 6 and are configured to be pivoted on a pair of opposite support walls 10 of the actuation unit (as shown in FIG. 3).

At the fourth end portion 62, the first lever member 6 further includes a pair of rollers 65, each protruding outwards from a corresponding lever arm 63 (in parallel to a corresponding protrusion 66). The rollers 65 are aligned along an axis parallel to the second axis $A_2$. The rollers 65 form the above-mentioned sliding elements of the first lever arm 6 and their rolling surfaces 650 form the above-mentioned sliding surfaces.

As mentioned above, the first lever member 6 is coupled (indirectly) with the contact shaft 4. Conveniently, the above-mentioned kinematic chain further includes a plurality 7 of second lever members mutually hinged at a plurality of rotation axes parallel to the first rotation axis $A_1$ of the contact shaft 4 and coupling the first lever member 6 (namely the fourth end portion 62 thereof) to the contact shaft 4.

Conveniently, the actuation unit 1 includes also second mechanical actuation means 2 configured to actuate the contact shaft 4 during an opening maneuver of said switching apparatus.

In general, the above-mentioned contact shaft 4, first mechanical actuation means 5, 6, 7 and second mechanical actuation means 2 may be realized at industrial level according to solutions of known type. Therefore, in the following, they will be described only in relation to the aspects of interest of the disclosure, for the sake of brevity.

According to the disclosure, the actuation unit 1 further includes mechanical loading means 8, 9 configured to actuate the first lever member 6 of the first mechanical actuation means in order to load the spring assembly 5, i.e., bring this latter from the released condition B to the loaded condition A.

The above-mentioned mechanical loading means advantageously include one or more actuating devices 8 that can be activated by a user to load the spring assembly 5. In practice, the actuating device 8 are configured to provide the mechanical energy necessary to bring the spring assembly 5 from a released condition B to a loaded condition A.

As shown in FIG. 1, the actuating devices 8 may include, for example, a lever mechanism that can be manually operated by a user. Alternatively, or in addition to the above, the actuating devices 8 may include an electric motor activatable through a suitable user interface.

In general, the above-mentioned actuating devices 8 may be realized at industrial level according to solutions of known type. Therefore, in the following, they will be described only in relation to the aspects of interest of the disclosure, for the sake of brevity.

The above-mentioned mechanical loading means further include a cam assembly 9 configured to rotate about a third rotation axis $A_3$ parallel to the rotation axis $A_1$ of the contact shaft 4.

The cam assembly 9 includes a motion transmission shaft 91 and one or more cam members 92 coupled to said motion transmission shaft.

As shown in the cited figures, the motion transmission shaft 91 has opposite ends pivoted on opposite support walls 10 of the actuation unit to rotate about the third rotation axis $A_3$.

The motion transmission shaft 91 is coupled to the one or more actuating devices 8, may be at one of its opposite ends. To this aim, suitable gear mechanisms (not shown) of known type can be employed.

Each cam member 92 is coupled to the motion transmission shaft 91 in such a way to rotate together with said motion transmission shaft.

Each cam member 92 includes a cam surface 920 couplable to the first lever member 6, more particularly to the sliding surface 650 of a corresponding sliding element 65 of the first lever member.

According to the embodiment shown in the cited figures, the cam assembly 9 includes a pair of cam members 92 spaced apart one from another along the third rotation axis $A_3$ and arranged on the motion transmission shaft 91, and may be in proximity of the opposite support walls 10 of the actuation unit 1, on which said motion transmission shaft is pivoted.

According to other embodiments of the disclosure, however, the cam assembly 9 may include a single cam member 92 in proximity of a corresponding support wall 10 of the actuation unit.

The cam assembly 9 is configured to move reversibly, by rotating about the third rotation axis $A_3$ according to a same predefined direction $R_3$, between a third position E, which corresponds to a first position C of the first lever member 6, and a fourth position F, which corresponds to a second position D of the first lever member 6.

The cam surface 920 of each cam member 92 is oriented in such a way that it couples with the sliding surface 650 of a corresponding sliding element 65 of the first lever member 6, when the cam assembly 9 moves from the fourth position F to the third position E.

According to the embodiment shown in the cited figures, the actuation unit 1 includes mechanical triggering means 13 couplable to the cam assembly 9, more particularly to a cam member 92 of said cam assembly.

The triggering means 13 include a triggering lever 130 configured to engage and hold the cam assembly 9 in the third position E once this latter has reached the third position E in such a way to leave the cam assembly 9 free to move from the third position E to the fourth position F, when a closing maneuver of said switching apparatus is carried out.

In general, the above-mentioned triggering means 13 may be realized at industrial level according to solutions of known type. Therefore, in the following, they will be described only in relation to the aspects of interest of the disclosure, for the sake of brevity.

The operation of the above-mentioned first mechanical actuation means 5, 6, 7 and mechanical loading means 8, 9 is briefly described in the following with reference to FIGS. 6-9.

Figure 9:
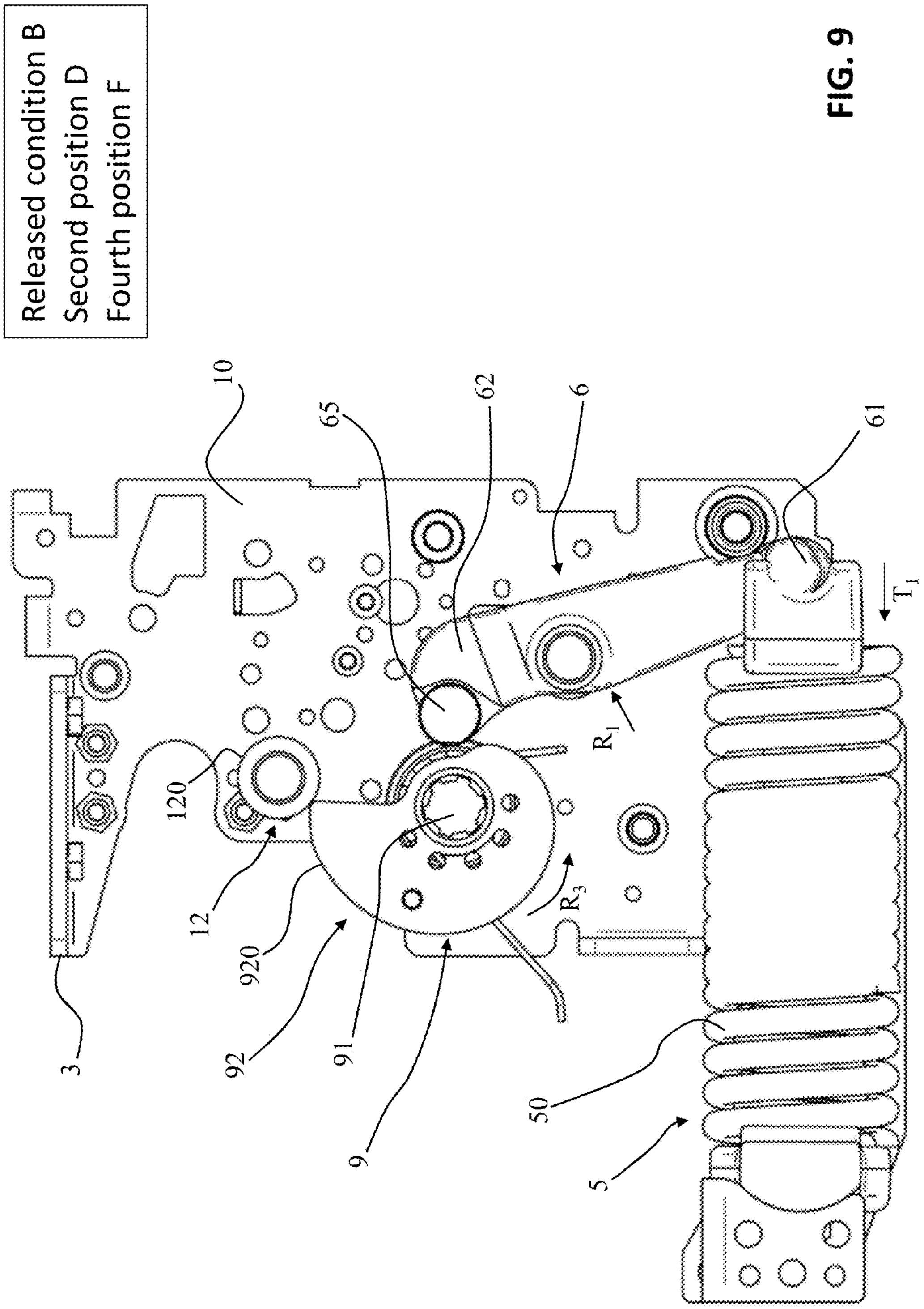

The spring assembly 5 is supposed to be in a released condition B (FIG. 9).

In this situation, it is necessary to bring it in loaded condition A in order to make the actuation unit 1 ready to drive a closing maneuver of the switching apparatus.

When the spring assembly 5 is in a released condition B, the first lever member 6 is in the second position D and the cam assembly 9 is in the fourth position F.

In order to load the spring assembly 5, the user activates an actuating device 8.

Figure 6:
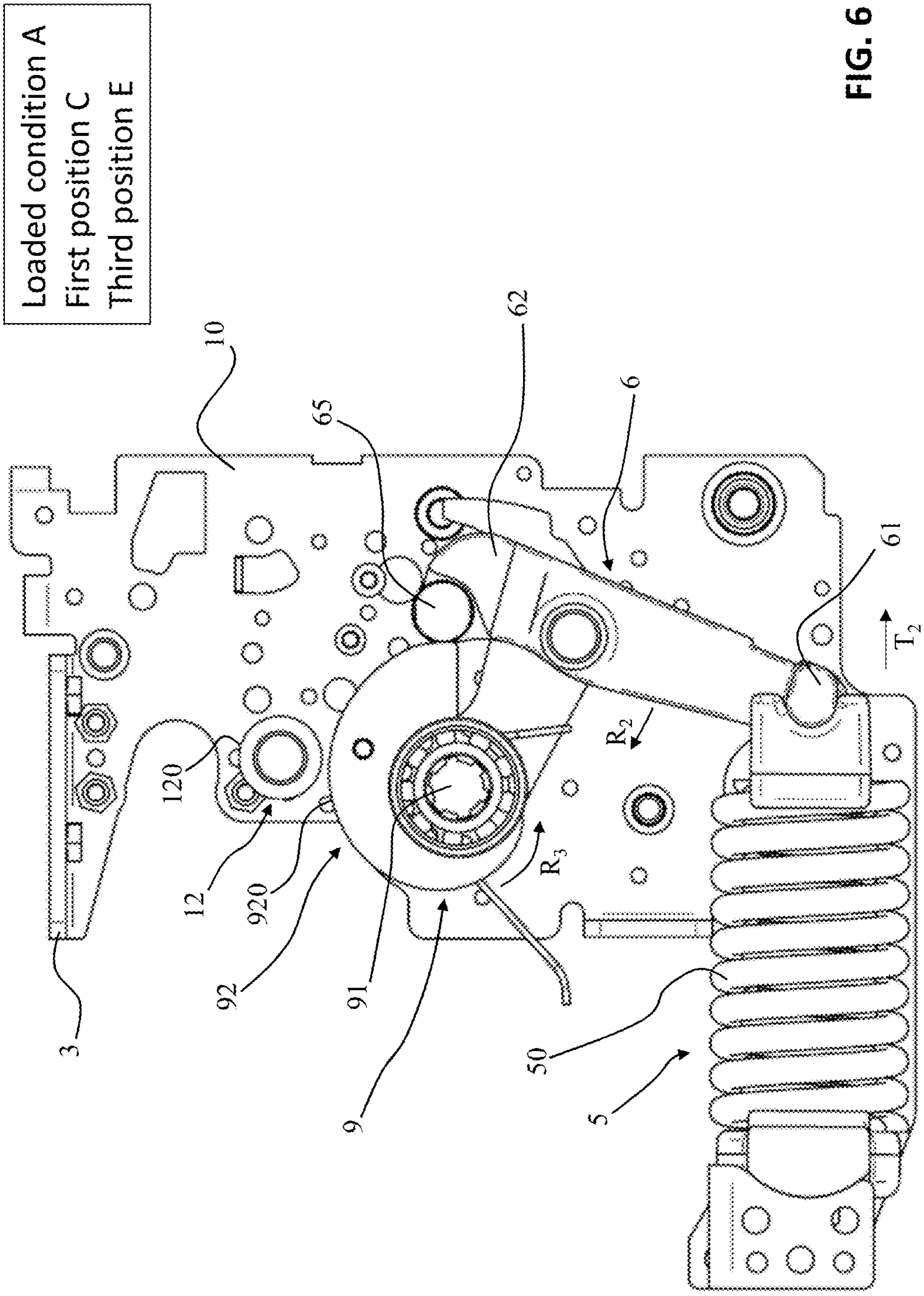
FIGS. 6-9 are schematic views showing the operation of the mechanical components shown in FIGS. 2, 3, 4A, 4B, and 5.

Upon actuation by the actuating device 8, the cam assembly 9 rotates according to the predefined third direction $R_3$ and moves from the fourth position F (FIG. 9) towards the third position E (FIG. 6). During this movement of the cam assembly, the cam surface 920 of each cam member 92 couples with the sliding surface 650 of a corresponding sliding element 65 of the first lever member 6. The cam assembly 9 thus actuates the first lever member 6, which is moved, according to a first direction $R_1$, from the second position D (FIG. 9) towards the first position C (FIG. 6). In doing so, the first lever member 6 actuates the spring assembly 5 in such a way to compress the spring elements 50 (reference $T_1$). The spring assembly 5 is thus brought from the released condition B (FIG. 9) to a loaded condition A (FIG. 6).

When it reaches the third position E, a cam unit 92 of the cam assembly 9 is engaged by the triggering means 13. The triggering lever 130 engages a corresponding can unit 92 and holds the whole cam assembly 9 in the third position E. In turn, the cam assembly 9 holds the first lever member 6 in the first position C and the first lever member 6 holds the spring assembly 5 in the loaded condition A.

The actuation unit 1 is now ready to drive a closing maneuver of the switching apparatus.

In order to carry out a closing maneuver of the switching apparatus, the user activates the triggering means 13. The trigger lever 130 moves in such a way to disengage from the cam assembly 9.

The cam assembly 9 is now free to move from the third position E (FIGS. 6-8) to the fourth position F (FIG. 9) by rotating always according to the predefined third direction $R_3$. The cam assembly 9 thus leaves the first lever member 6 free to move from the first position C (FIGS. 9-10) to the second position D (FIG. 9) by rotating according to a second direction $R_2$ opposite to the first direction $R_1$. In turn, the first lever member 6 leaves the spring assembly 5 free to pass (reference $T_2$) from the loaded condition A (FIG. 6) to a released condition B (FIG. 9).

In doing so, the spring assembly 5 releases the stored mechanical energy, which is thus transmitted through the first lever member 6 and the second lever members 7 to the contact shaft 4. In this way, the contact shaft 4 can actuate the movable contacts 103 of the switching apparatus. As a consequence of the release of the spring assembly 5, the first lever 6 actuates the cam assembly 9 while moving away from the first position C. This latter is thus pushed away from the third position E and can freely rotate towards the fourth position F (rest position).

An essential aspect of the disclosure consists in that the actuation unit 1 includes, for at least a cam member 92 of the cam assembly 9, a brake member 12 configured to brake said cam assembly during the rotation movement from the third position E to the fourth position F (such a rotation movement occurs during a closing maneuver of the switching apparatus as explained above).

Each brake member 12 is arranged in fixed position relative to a corresponding cam member 92 and has a sliding surface 120 configured to come into frictional contact with the cam surface 920 of the corresponding cam member 92, during a rotation movement of the cam assembly 9 from the third position E to the fourth position F (rest position). The mechanical interaction between the sliding surface 120 of each brake member 12 and the cam surface 920 of the corresponding cam member 92 causes a reduction of the rotational speed of the cam assembly.

According to the embodiment shown in the cited figures, the actuation unit 1 includes a brake member 12 for each cam member 92 of the cam assembly 9.

According to other embodiments (not shown), however, even if the cam assembly 9 includes a pair of cam members 92, the actuation unit 1 may include a brake member 12 only for one of the cam members 92 of the cam assembly 9.

According to an aspect of the disclosure, each brake member 12 is positioned relative to a corresponding cam member 92 of the cam assembly, so that the sliding surface 120 of the brake member comes into frictional contact with the cam surface 920 of the cam member 92 at an initial stage of the rotation movement of the cam assembly 9 from the third position E to the fourth position F. This solution is particularly advantageous as it allows reducing the rotational speed of the cam assembly, as soon as this latter starts moving. The cam assembly 9 is thus prevented from reaching excessively high values of rotational speed.

According to an aspect of the disclosure, each brake member 12 has a portion of elastic material (for example rubber) including the sliding surface 120. This solution improves remarkably the dissipation of the kinetic energy of the cam assembly 9, when each cam member 12 comes into frictional contact with the corresponding cam member 92 of the cam assembly. The rotational speed of the cam assembly 9 may thus be reduced more efficiently.

According to an aspect of the disclosure, each brake member 12 is fixed to a support wall 10 of the actuation unit in proximal position to a corresponding cam member 92 of the cam assembly. Each brake member 12 is positioned so that it does not interact with the corresponding cam member 92, when the cam assembly 9 moves from the fourth position F to the third position E (i.e., during the loading of the spring assembly 5), and it comes into frictional contact with the corresponding cam member 92 only when the cam assembly 9 moves from the third position E to the fourth position F (i.e., during a closing maneuver of the witching apparatus).

According to an aspect of the disclosure, each brake member 12 is formed by a roller fixed to a support wall 10 of the actuation unit as explained above. The roller 12 includes a sliding surface 120 couplable to the cam surface 920 of a corresponding cam member 92 when the cam assembly 9 moves from the third position E to the fourth position F.

Each roller 12 may have an outer layer 120*a* of elastic material (e.g., rubber), which includes the sliding surface 120. In practice, the rotating outer surface of the roller 12 forms the above-mentioned sliding surface 120 intended to come into frictional contact with the cam surface 920 of a corresponding cam member 92. As mentioned above, this solution makes more effective the braking action of the brake members 12. In fact, when a roller 12 comes into frictional contact with a corresponding cam member 92, the outer layer 120*a* is subject to an elastic deformation, which effectively dissipates the kinetic energy of the cam assembly 9.

The operation of brake member 12 of the actuation unit 1 is described in more details with reference to FIGS. 12-14.

Figure 7:
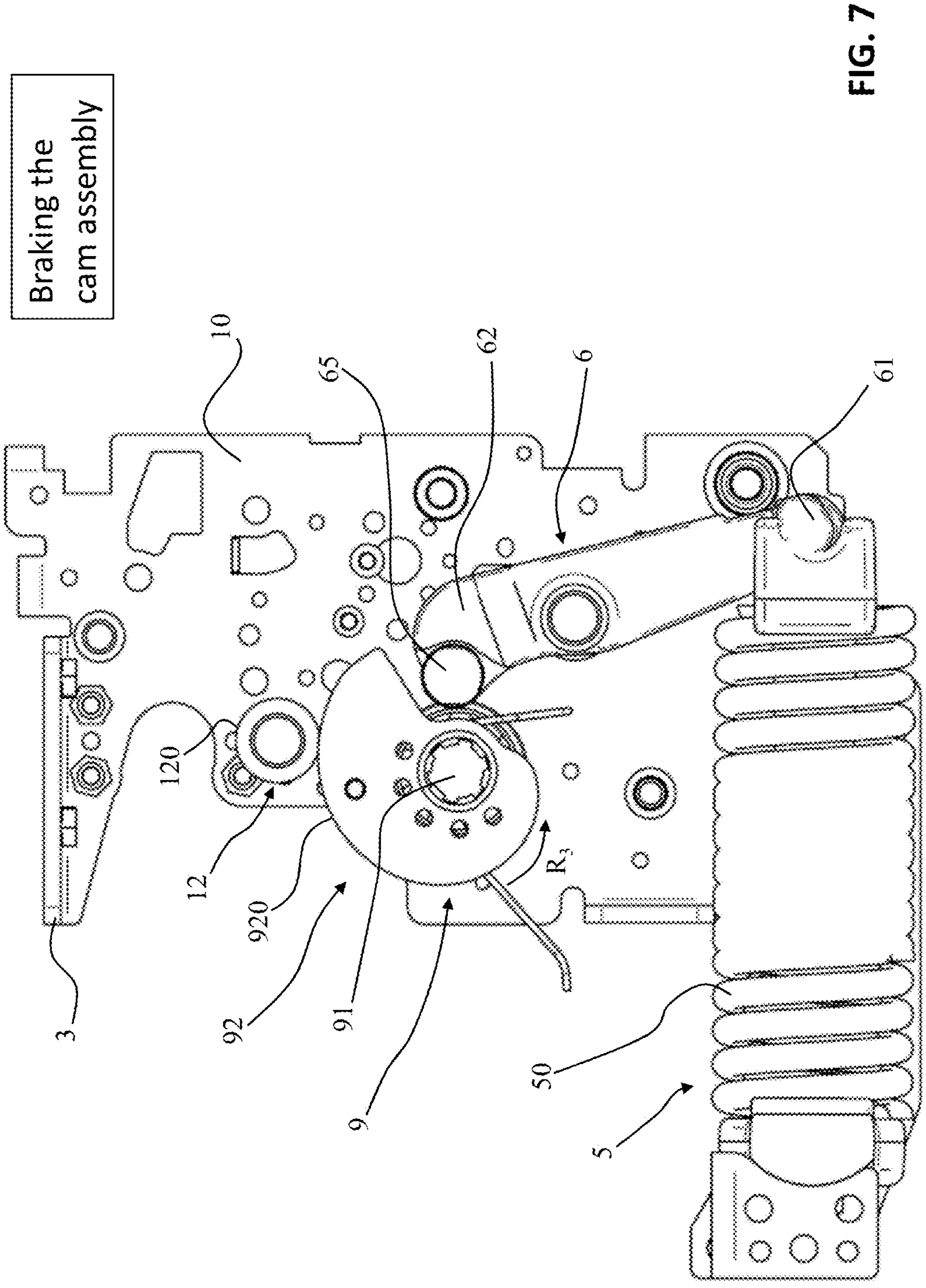
Figure 8:
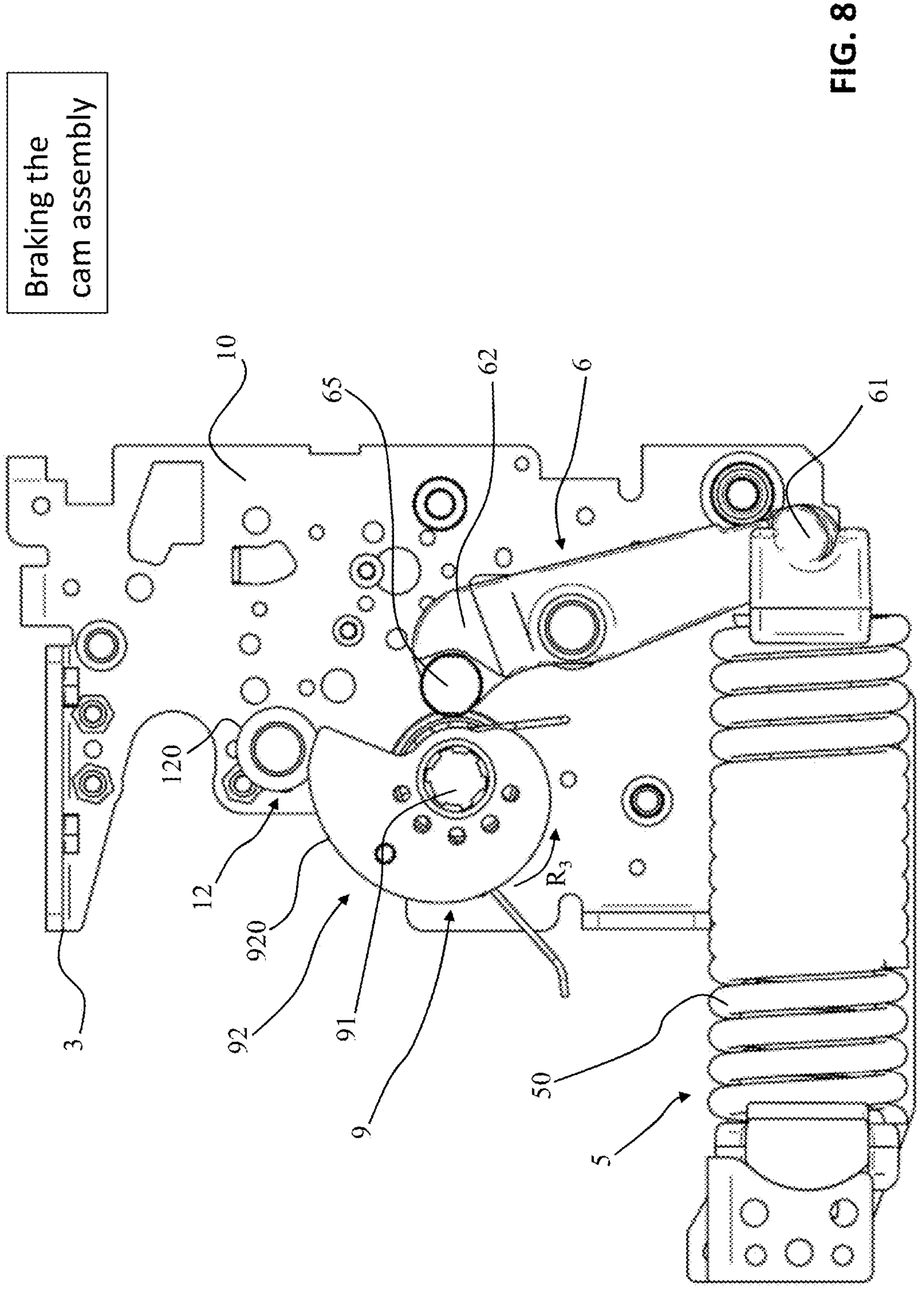

When the cam assembly 9 moves from the third position E to the fourth position F by rotating according to the predefined third rotation direction $R_3$, the sliding surface 120 of the roller 12 comes into frictional contact with the cam surface 920 of a corresponding cam member 92 (FIGS. 6-7).

At this initial braking phase, the outer layer 120*a* starts deforming elastically and the cam assembly 9 starts reducing its rotational speed.

As the rotation of the cam assembly 9 continues (FIG. 8), the cam member 92 causes a progressively increasing deformation of the outer layer 120*a* of the roller 12. The dissipation of kinetic energy of the cam assembly 9 increases accordingly. The cam assembly 9 is thus subject to a progressive decrease of rotational speed until it reaches the fourth position F (rest position).

As it is evident from the above, the mutual interaction between each brake member 12 and the cam surface 920 of the corresponding cam member 92 effectively reduces the rotational speed of the cam assembly 9. This latter therefore reaches the rest position F with a lower level of kinetic energy. In this way, the effects of possible collisions (at the end of run of the cam assembly) of the cam members 92 with the surrounding components (e.g., the sliding elements 65 of the first lever member 6) can be effectively mitigated.

As mentioned above, the mechanical interaction between each roller 12 and the cam surface 920 of the corresponding cam member 92 occurs at an initial stage of the rotational movement of the cam assembly 9, i.e., before this latter rotates at its maximum speed levels. It has been seen that this solution allows preventing even more effectively possible structural damages of components hit by the cam assembly 9, when this latter reaches its rest position F.

Technical Advantages of the Disclosure

The actuation unit 1, according to the disclosure, provides remarkable advantages with respect to the known apparatuses of the state of the art.

The arrangement of one or more brake members 12 allows prolonging remarkably the operating life of the components of the actuation unit, which are configured to interact with the cam members 92 during the rotational movements of the cam assembly 9.

In particular, the arrangement of the brake members 12 in the actuation unit allows preventing or reducing possible structural damages to the sliding elements 65 of the first lever 6, which are normally hit by the cam members 92, when the cam assembly 9 returns in its rest position F.

The actuation unit 1, according to the disclosure, can therefore ensure improved levels of reliability in operation, which allows reducing maintenance interventions and costs.

As it is evident from the above, the one or more brake members 12 can be easily integrated with the structure of the cam members 92 and the adjacent support walls 10. The actuation unit 1 can thus be realized with a very simple and compact structure.

On the other hand, the one or more brake members 12 are quite simple and cheap to realize at industrial level. The arrangement of these brake members thus does not entail relevant cost increases for the actuation unit 1, which can thus be industrially manufactured at competitive costs with respect to the solutions of the state of the art.

What is claimed is:

1. An actuation unit for a switching apparatus, wherein said actuation unit is configured to actuate one or more movable contacts of said switching apparatus during a closing maneuver and an opening maneuver of said switching apparatus, wherein said actuation unit comprises:

a contact shaft coupled to the one or more movable contacts of said switching apparatus and reversibly movable about a corresponding first rotation axis; and first mechanical actuation means coupled to said contact shaft and configured to actuate said contact shaft during a closing maneuver of said switching apparatus, wherein said first mechanical actuation means comprise:

a spring assembly including one or more spring elements, wherein said spring assembly is configured to take reversibly a loaded condition, at which said spring elements are loaded and store mechanical energy, and a released condition, at which said spring elements have released the stored mechanical energy; and a kinematic chain coupling said spring assembly to said contact shaft, said kinematic chain including a first lever member movable about a second rotation axis parallel to said first rotation axis and coupled to said spring assembly, wherein said first lever member is configured to move reversibly between a first position, which corresponds to said loaded condition of said spring assembly, and a second position, which corresponds to said released condition of said spring assembly, wherein said actuation unit further comprises mechanical loading means configured to actuate said first lever member and said spring assembly in order to make said spring assembly pass from said released condition to said loaded condition, wherein said mechanical loading means comprise a cam assembly movable about a third rotation axis parallel to said first rotation axis and including one or more cam members, each cam member having a cam surface couplable to said first lever member, wherein said cam assembly is configured to move reversibly between a third position, which corresponds to said first position of said first lever member, and a fourth position, which corresponds to said second position of said first lever member, wherein said actuation unit comprises, for at least a cam member of said cam assembly, a brake member configured to brake said cam assembly, and wherein each brake member is in a fixed position relative to a corresponding cam member and has a sliding surface configured to come into frictional contact with the cam surface of a corresponding cam member, during a rotation movement of said cam assembly from said third position to said fourth position, a mechanical interaction between the sliding surface of each brake member and the cam surface of the corresponding cam member causing a reduction of a rotational speed of said cam assembly.

2. The actuation unit according to claim 1, wherein each brake member is positioned relative to a corresponding cam member, so that the sliding surface of said brake member comes into frictional contact with the cam surface of said cam member at an initial stage of the rotation movement of said cam assembly from said third position to said fourth position.

3. The actuation unit according to claim 1, wherein each brake member is fixed to a corresponding support wall of said actuation unit in proximal position to a corresponding cam member of said cam assembly.

4. The actuation unit according to claim 1, wherein each brake member has a portion of elastic material including said sliding surface.

5. The actuation unit according to claim 1, wherein each brake member is formed by a roller fixed to a support wall of said actuation unit.

6. The actuation unit according to claim 5, wherein each roller has an outer layer of elastic material including said sliding surface.

7. The actuation unit according to claim 1, wherein said spring assembly includes a first end portion fixed to a third support wall, a second end portion opposite to said first end portion and coupled to said first lever member, and one or more compression springs arranged between said first and second end portions.

8. The actuation unit according to claim 1, wherein said first lever member has a third end portion coupled to said spring assembly and a fourth end portion opposite to said third end portion and coupled to said contact shaft through one or more second lever members, said first lever member comprising one or more sliding elements arranged at said fourth end portion, each sliding element having a sliding surface couplable to the cam surface of a corresponding cam member of said cam assembly.

9. The actuation unit according to claim 1, wherein said cam assembly comprises a pair of cam members spaced apart one from another along said third rotation axis.

10. The actuation unit according to claim 9, wherein the actuation unit comprises a brake member for each cam member.

11. The actuation unit, according to claim 1, wherein said cam assembly is configured to actuate said first lever member and make said first lever member move from said second position to said first position, when said cam assembly moves from said fourth position to said third position upon actuation by an actuating device coupled to said cam assembly, wherein said cam assembly is configured to hold said first lever member when said cam assembly is in said third position, and wherein said cam assembly is configured to leave said first lever member free to move from said first position to said second position, when said cam assembly moves away from said third position.

12. The actuation unit according to claim 1, wherein said first lever member is configured to actuate said spring assembly and make said spring assembly pass from said released condition to said loaded condition, when a first motion transmission assembly moves from said second position to said first position upon actuation by said cam assembly, wherein said first lever member is configured to hold said spring assembly in said loaded condition when said first lever member is in said first position, and wherein said first lever member is configured to leave said spring assembly free to pass from said loaded condition to said released condition, when said first lever member moves away from said first position.

13. A switching apparatus comprising the actuation unit according to claim 1.

14. The switching apparatus according to claim 13, wherein the switching apparatus is configured to operate at medium voltage levels.

* * * * *